Dec. 17, 1963  H. J. FANNING  3,114,599
GAS STERILIZER
Filed Dec. 18, 1961  2 Sheets-Sheet 1
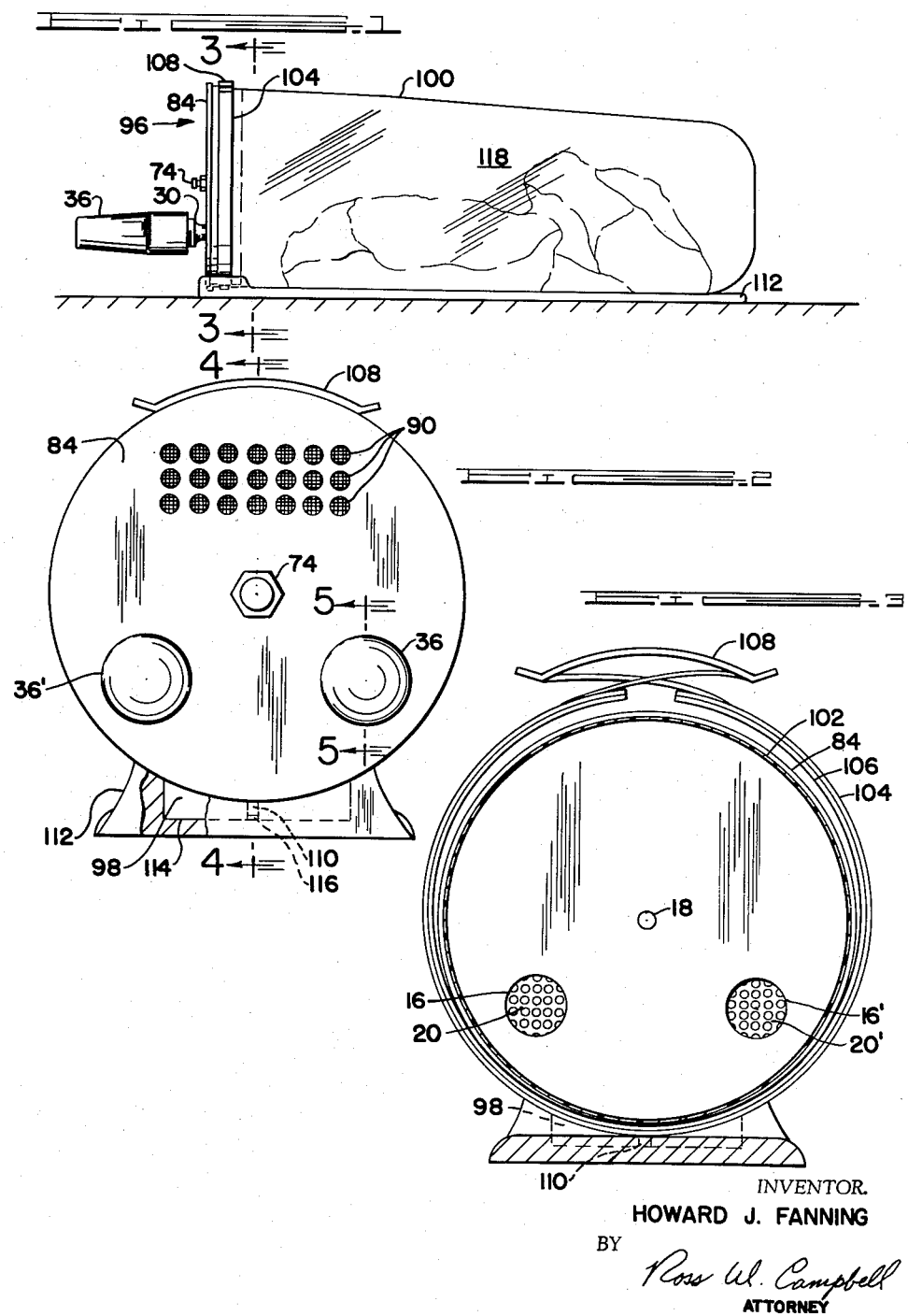
INVENTOR.
HOWARD J. FANNING
BY
Ross W. Campbell
ATTORNEY Dec. 17, 1963 H. J. FANNING 3,114,599
GAS STERILIZER
Filed Dec. 18, 1961 2 Sheets-Sheet 2
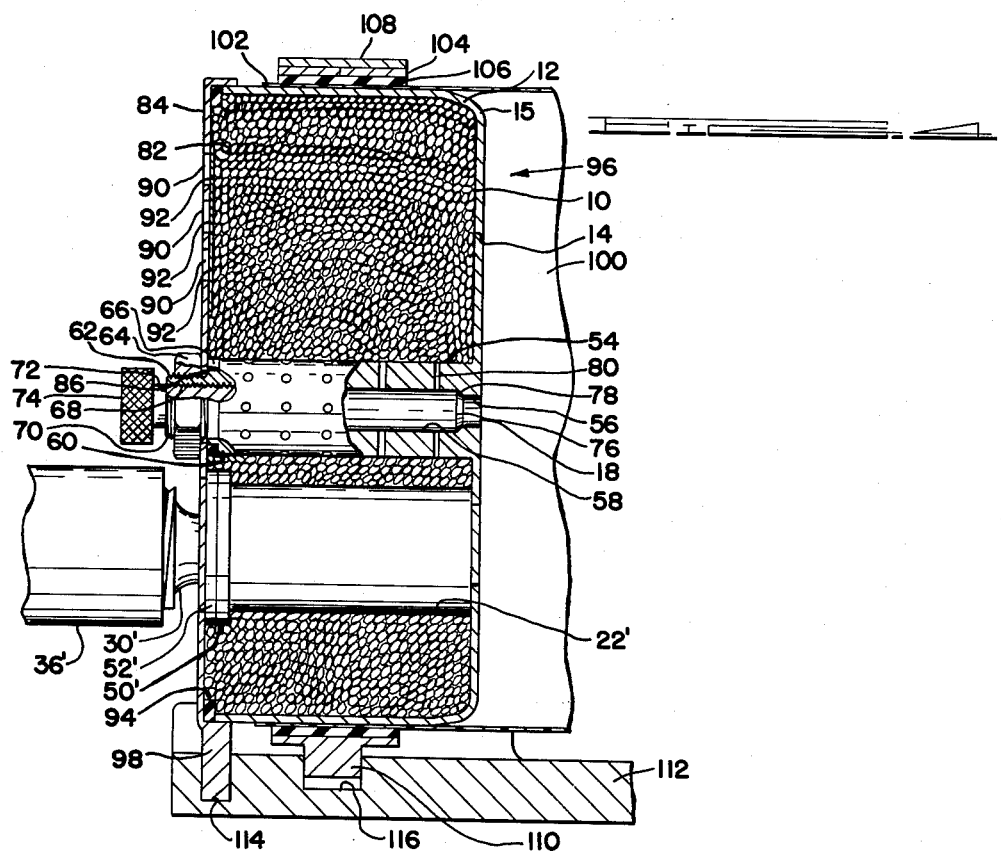
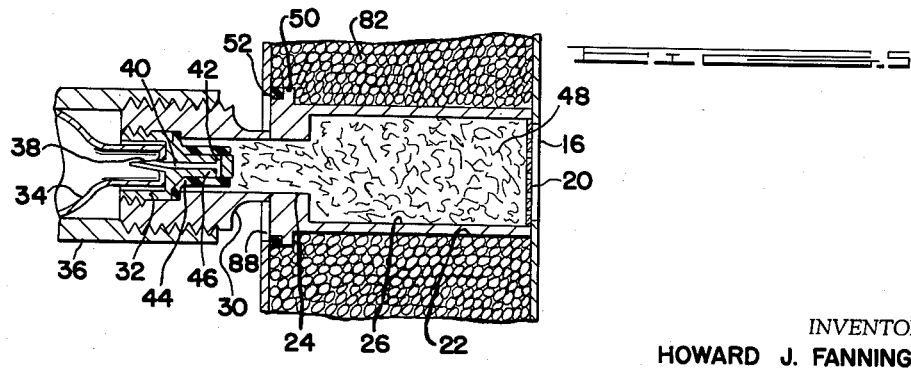
INVENTOR.
HOWARD J. FANNING
BY Ross W. Campbell
ATTORNEY United States Patent Office 3,114,599
Patented Dec. 17, 1963

3,114,599
GAS STERILIZER
Howard J. Fanning, 1766 Sanford Place,
Ann Arbor, Mich.
Filed Dec. 18, 1961, Ser. No. 160,054
10 Claims. (Cl. 21—98)

This invention relates to improved sterilization apparatus of the type employing a gaseous sterilant.

Heretofore, sterilization apparatus of the type adapted for portability and utilizing a gas as a sterilizing agent has employed a pair of rigid, nesting, concentric cylinders arranged for relative sliding movement to form a sterilization chamber of variable length, with gas bulb release means associated with one cylinder and exhaust valve and gas adsorption means associated with the other cylinder. Contaminated objects of nonconforming shape, such as surgical, medical, dental, and laboratory instruments and/or equipment of width greater than the greatest cross-sectional dimension of the chamber or of such length as to be received by the chamber only when the two cylinders were in expanded relation, could not be accommodated therein by the chamber due to the rigid cross section thereof and the necessity of contracting the chamber longitudinally during the operation of the apparatus.

Complete contraction of the chamber prior to introduction of the gaseous sterilant therein to exhaust all pure air was prevented by the rigidity of the cylinder structure. It was therefore necessary to introduce an excess of sterilant into the chamber and to reciprocate the cylinders to flush out the air introduced into the chamber with the contaminated article. The costly excess sterilant was thus lost to the outer atmosphere without having accomplished any substantial sterilizing effect upon the contaminated object.

Following sterilization of an object, repeated reciprocation of the cylinders was again required to exhaust the used sterilant to the outer atmosphere. Due again to the rigidity of the cylinder structure, complete exhaustion could only be achieved by introducing atmospheric air into the chamber to dilute and flush out the gaseous sterilant. Contaminating microorganisms, viruses, and spores were thus necessarily introduced into the chamber and to the sterilized object with the atmospheric air as a part of the process of exhaustion of the used sterilant from the chamber.

Further, the sealing means necessarily disposed between the cylinders was subjected to abrasion and wear by reciprocation of the cylinders, and the rigidity of the cylinders caused the apparatus to be bulky and vulnerable to damage during transportation and field use.

It is accordingly an object of this invention to provide an improved sterilizing apparatus employing a gaseous sterilizing agent. Another object of the invention is to provide apparatus for the sterilization of contaminated objects of such shape and length that they are not adapted to be received within a chamber of at least moderate rigidity and conveniently portable size. Another object of the invention is to provide improved gaseous sterilization apparatus adapted for the expulsion of substantially all of the air from the sterilization chamber thereof prior to the introduction of a gaseous sterilant therein. Another object of the invention is to provide in a gaseous sterilization apparatus gas supply and control means adapted for releasable gastight connection as a unit to the mouth of a baglike sterilization chamber. Another object of the invention is to provide in a single housing for gaseous sterilization apparatus means for introducing a gaseous sterilant to a connected chamber and means for controlling the release of gas from such chamber. Another object of the invention is to provide in a gaseous sterilization apparatus a nonrigid sterilization chamber adapted for rapid, gastight attachment to and detachment from a rigid member having complete gas control means associated therewith. A further object of the invention is to provide in a gaseous sterilization apparatus a completely collapsible, foldable, transparent, and easily replaceable sterilization chamber. Still a further object of the invention is to provide in a sterilization apparatus of the type adapted to utilize gas as a sterilizing agent a collapsible sterilization chamber adapted for complete collapse in any one or more dimensions thereof to expel all gaseous content thereof.

Other objects of the invention, and the various features of novelty, will become apparent to those skilled in the art from the following description of a preferred embodiment of the invention, reference being made to the accompanying drawings, forming a part of this specification, in which like characters are employed to designate like parts throughout the same and wherein:

FIGURE 1 is a side view of an improved sterilizing apparatus adapted to utilize a gas as a sterilizing agent.

FIGURE 2 is a front view, partially in section, of the improved sterilizing apparatus.

FIGURE 3 is a sectional view taken as along line 3—3 of FIGURE 1 but with the clamping band unlatched.

FIGURE 4 is a sectional view taken along line 4—4 of FIGURE 2.

FIGURE 5 is a sectional view taken along line 5—5 of FIGURE 2.

Briefly and broadly, my improved sterilizing apparatus includes a control housing adapted to be releaasbly engaged in gastight surrounded relationship by a gastight, baglike, completely collapsible sterilization chamber. The housing includes conventional means for retaining and piercing a conventional pierceable ampule containing under pressure a vaporable sterilant, a gas inlet passage whereby the sterilant released from the ampule upon piercing thereof is conducted into the sterilization chamber, means within the gas inlet passage for increasing the rate of vaporization and expansion of the sterilant, valve means to selectively retain gas within and permit the release of gas from the sterilization chamber, gas adsorbent means, and means constraining gas released from the sterilization chamber to pass through said adsorbent means and from thence into the outer atmosphere. Means such as a band and band latch are provided to releasably form a gastight connection between the sterilization chamber and the control housing.

Referring now more particularly to the drawings, a cylinder 10, having a side wall 12 and a closed end 14 as best shown in FIGURE 4, is formed of rigid material, such as stainless steel, impervious to and nonreactive with the gas to be employed as a sterilant. Side wall 12 is rounded about its perimeter near its juncture with end 14, as shown at 15, for a purpose hereinafter described. A pair of inlet apertures 16 and 16', and an exhaust aperture 18, are provided in end 14. Perforated screens 20 and 20' are secured as by brazing to end 14 so as to cover apertures 16 and 16', respectively.

A cylinder 22, having a longitudinal bore 24 and a coaxial counterbore 26 therein, is attached as by brazing to the inner surface of end 14 in gastight relation thereto with the counterbore surrounding screen 20 and aperture 16. The other end of cylinder 22 and bore 24 are connected as by brazing to a bushing 30. A conventional piercing pin assembly 32 is threadably retained within bushing 30 and disposed to engage and pierce a conventional pierceable ampule 34. Ampule 34 contains under pressure a conventional sterilizing agent, such as ethylene oxide, disposed to assume a gaseous state at atmospheric pressures and conventional temperatures and to kill, destroy, or otherwise render harmless bacteria, viruses, spores, and microorganisms with which it comes in contact. Bushing 30 is externally threaded to threadably engage a conventional threaded ampule holder 36 adapted to receive and retain ampule 34 in spaced relationship with a hollow piercing pin 38 of piercing pin assembly 32 when the holder is but partially engaged with bushing 30 and, upon complete engagement of the holder with the bushing, to force the ampule into engagement with the pin to be pierced thereby, thus forming an outlet in the ampule for the contents thereof.

When ampule 34 is thus pierced, its pressurized contents flow through a longitudinal channel 40 and a transverse channel 42 of pin 38, expand a rubber gasket 44 surrounding a rearwardly projecting stem 46 of the pin assembly, and pass rearwardly between the expanded gasket and the stem through bore 24, counterbore 26, screen 20, and aperture 16. Gasket 44 prevents reverse flow from bore 24 back into channel 42. Bore 24 and counterbore 26 are substantially filled with a plurality of metal turnings 48, or the like, which provide an increased surface area over which the contents of ampule 34 will flow to increase the rate of evaporation and expansion thereof. A flange 50 and a gasket 52 adjacent the flange are provided surrounding the outer end of cylinder 22. A first gas inlet assembly is thus formed.

Another cylinder 22′ similar to cylinder 22 and bearing a flange 50′ and a gasket 52′ is similarly attached to the inner surface of end 14 surrounding screen 20′ and aperture 16′. Cylinder 22′ bears at its outer end a threaded bushing 30′ similar to bushing 30 and containing a piercing pin assembly (not shown) similar to piercing pin assembly 32, and disposed to receive a threaded ampule holder 36′ similar to holder 36. Holder 36′ is adapted to receive a second gas ampule (not shown) similar to ampule 34 and containing a similar sterilant. The internal construction of cylinder 22′ is similar to that of cylinder 22 and includes a counterbore (not shown) containing a plurality of turnings (not shown) similar to turnings 48. A second gas inlet assembly is thus formed identical in construction and operation to the first gas inlet assembly. While I have shown and described two gas inlet assemblies in the preferred embodiment of my invention, it is to be understood that only a single gas inlet assembly is essential to my invention and that the inclusion of a second assembly is a matter of preference only. If desired, a third or even more gas inlet assemblies of similar construction may be included to provide sufficient sterilant in gaseous form to expand and fill a collapsible sterilization chamber of any selected volume as hereinafter described.

Another cylinder 54 is secured as by brazing to the inner surface of end 14 and surrounding exhaust aperture 18, and has a longitudinal bore 56 therein connecting aperture 18 to a counterbore 58. The outer end of cylinder 54 is rdeuced in diameter to form a shoulder 60 and bears external threads 62 to threadably receive a nut 64. A gasket 66 surrounds cylinder 54 adjacent shoulder 60. The outer end of counterbore 58 bears internal threads 68 to engage threads 70 of a threaded valve stem 72. Valve stem 72 is provided with a knurled knob 74 at its outer end and, at the other end thereof, with a conical valve head 76 adapted to seat against a conical valve seat 78 formed at the juncture of bore 56 and counterbore 58 to provide a releasable gastight seal. A plurality of radial channels 80 is formed in cylinder 54 to provide passages for gas from counterbore 58 to the interior of cylinder 10. Cylinder 10 is completely filled with activated charcoal 82, or other material having a similar adsorbent property, surrounding cylinders 22, 22′, and 54, to adsorb the gaseous sterilant when valve head 76 is unseated from seat 78 and the gas passes through aperture 18, bore 56, counterbore 58, and channels 80 and into the interior of the housing.

A circular, flanged cover plate 84 is provided to cover the end of cylinder 10 opposite end 14. Cover plate 84 is provided with an aperture 86 to surround threads 62 so as to be retained tightly against gasket 66 by nut 64.

A second aperture 88 is provided in cover plate 84 to surround bushing 30 and disposed to be retained tightly against gasket 52 when the cover plate is secured to cylinder 10. A third aperture (not shown) is similarly provided in cover plate 84 to surround bushing 30′ and similarly disposed to be tightly retained against gasket 52′ of the second gas inlet assembly. A plurality of additional apertures 90 is provided in cover plate 84, and is covered by a wire screen 92 attached to the cover plate, to permit the sterilant to emerge from cylinder 10 for dissipation into the atmosphere as it desorbs from the activated charcoal 82 or other adsorbent material similarly employed.

An annular gasket 94 is provided intermediate the outer end of side wall 12 and the inner face of plate 84. When nut 64 is tightly engaged with threads 62, extending through aperture 86, apertures 86, 88, and the aperture (not shown) surrounding bushing 30′ are sealed gastight against gaskets 52, 66, and 52′, respectively, and cover plate 84 thus is secured to cylinder 10 to form a control housing 96. A base 98 is connected to cover plate 84 to support housing 89 in a manner more particularly hereinafter described.

A bag 100 of any convenient size and having a mouth 102 therein is formed from completely flexible, collapsible, gas-impervious and preferably transparent material, such as a polyester film, of either single thickness or laminated construction, to provide a sterilization chamber. Mouth 102 is of such circumference as to snugly fit around side wall 12 of cylinder 10, the rounded portion 15 of the side wall facilitating such engagement. If desired, a bead or other thickening may be provided around mouth 102 for ease in handling and mounting. A metal clamping band 104, adapted to surround mouth 102 and side wall 12, bears on its inner side an attached liner 106 of resilient pressure-transmitting material, such as neoprene, to insure a gastight seal between the bag and side wall. Latch means, such as spring latch 108, is provided to draw tightly and to releasably secure band 104 and liner 106 about mouth 102 and side wall 12. If desired, band 104 or liner 106 or both may be adapted to overlap or interlock (not shown) before they are drawn tight, so as to avoid any possibility of pinching bag 100 when latch 108 is closed. Band 104 bears a key 110 at the bottom thereof.

A tray 112 is provided and bears a channellike recess 114 and a second recess 116 in the upper surface thereof to receive, respectively, base 98 and key 110. Recess 114 is formed to snugly receive base 98 and to prevent horizontal movement of the base when the base is engaged within the recess. Key 110 is restrained by recess 116 from horizontal movement and thus prevents rotation of band 104 when latch 108 is open and the band loosened to permit attachment to or removal of bag 100 from cylinder 10. The depth of recess 116, however, is such that the bottom of the recess is spaced from the bottom of key 110 when band 104 is latched, thus providing space into which the key may drop and be received when the band is unlatched whereby the band will be spaced from bag 100 and side wall 12 to facilitate attachment or removal of the bag from cylinder 10. All parts of the apparatus contactable by the sterilant are formed of materials selected to be impervious to and nonreactive with the sterilant, except as hereinabove described.

In operation, ampule holder 36 is first unscrewed from bushing 30. Ampule 34 containing the pressurized sterilant is inserted into holder 36 and the holder then loosely threaded onto the external threads of bushing 30 without, however, engaging the holder and bushing sufficiently to cause pin 38 to penetrate the ampule. A second ampule of sterilant is similarly disposed within holder 36′. Articles desired to be sterilized, such as surgical, medical, dental or laboratory instruments and/or equipment, as shown at 118, either unsupported or together with a supporting tray (not shown), are then placed within bag 100 while the bag is disconnected from housing 96. If desired, the articles may be first wrapped in permeable wrappings. Mouth 102 of bag 100 is then slid over rounded portion 15 of cylinder 10 to surround side wall 12. Band 104 and its liner 106 are then drawn tightly about side wall 12 and mouth 100 by closing latch 108, thereby forming a gastight seal between the bag and side wall. Knob 74 is then rotated to unseat valve head 76 from valve seat 78, opening the valve. Bag 100 is then manually compressed completely about articles 118 to force the air contained within the bag outward through aperture 18, bore 56, counterbore 58, channels 80, charcoal 82, screen 92, and apertures 90. When bag 100 has been thus completely compressed and evacuated of air, or as nearly so as practicable, knob 74 is rotated in reverse direction to seat valve head 76 against valve seat 78, thus closing the valve and sealing bore 56.

Holder 36 is then further screwed into complete engagement with bushing 30, causing ampule 34 to be engaged with and pierced by pin 38 in the conventional manner. The pressurized sterilant contained within ampule 34 is thus released and flows through channels 40 and 42 of pin 38, expands gasket 44 radially outward from stem 46, and flows rearwardly therebetween into bore 24 and counterbore 26 and into contact with turnings 48, during which process it passes in transition from a liquid to a gaseous state, such transition being aided by the increased surface area provided by the turnings. In its gaseous state the sterilant passes through screen 20 of aperture 16 and expands and fills bag 100, permeating any permeable wrappings in which article 118 may be wrapped, intimately surrounding the articles and filling all apertures and cavities therein. When it is desired to introduce additional sterilant into bag 100, holder 36' may be similarly completely engaged with bushing 30', releasing in a similar manner the sterilant contained in the ampule (not shown) retained by the holder. Bag 100 is selected to have a volume sufficient to accommodate the contents in gaseous form of the ampules retained by holders 36 and 36'. It should be particularly noted that the unique structure of my invention permits the sterilant to contact articles 118 in a gasified state substantially undiluted by air and without the use of excess sterilant to first flush the sterilization chamber and to be lost to the outer atmosphere. The gaseous sterilant is then permitted to remain in intimate, undiluted contact with articles 118 for a predetermined sufficient length of time to completely sterilize them.

When a sufficient period of time has elapsed for the sterilant to accomplish complete sterilization of articles 118, knob 74 is rotated to unseat valve head 76 from valve seat 78, thus opening the valve. Bag 100 is then manually compressed about articles 118 to force substantially all of the gaseous sterilant outward from the bag through aperture 18, bore 56, counterbore 58, and channels 80, and into intimate contact with the particles of activated charcoal 82 within housing 96. Charcoal 82 adsorbs the noxious and toxic portions of the sterilant and releases same at a reduced rate of flow to dissipate into the atmosphere through screen 92 and apertures 90 in quantities and at a rate not hazardous, obnoxious, or toxic. It should be noted that, when the adsorptive property of activated charcoal 82 becomes reduced after repeated use, housing 96 may be recharged by simply removing cover plate 84, pouring out the used charcoal, pouring in a fresh charge of activated charcoal, and replacing the cover plate.

When all of the sterilant has been thus expelled from bag 100, latch 108 is released, loosening band 104. Band 104, when thus loosened, drops under influence of gravity until key 110 rests against the bottom of recess 116, spacing the band and liner 106 from mouth 102 and side wall 12 and facilitating removal of mouth 102 from surrounding engagement with cylinder 10. Sterilized articles 118 may then be removed from bag 100 through mouth 102 thereof.

It should be further particularly noted that, if it is desired to retain the sterilized articles 118 in sterile condition for an extended period of time, a cord (not shown) may be tightly drawn and knotted about bag 100 intermediate articles 118 and cylinder 10 after the bag has been compressed about the articles and substantially evacuated of sterilant and prior to disengagement of the bag from the cylinder. Bag 100, being impermeable, may then be transported or stored for an indefinite period of time with the sterilized articles 118 therein without contamination of the articles. Housing 96 will remain, however, available for immediate reuse with a replacement bag 100.

It is to be understood that the form of the invention herewith shown and described is to be taken as a preferred embodiment of the same and that resort may be had to various changes in construction without departing from the scope of the invention nor of the subjoined claims.

What is claimed is:

1. A sterilizing apparatus comprising, a gas-impermeable barrier, a completely flexible and collapsible gas-impermeable bag having an aperture permitting insertion therein of articles to be sterilized and adapted to be horizontally mounted in gas-tight connection to said barrier, means to releasably connect said bag to said barrier in gastight relationship therewith, means for introducing into said bag through said barrier a sterilant adapted to assume a gaseous state, outlet means, permitting said sterilant to pass from said bag through said barrier to the external atmosphere, and control means for releasably preventing sterilant from passing through said outlet means.

2. A sterilizing apparatus according to claim 1 which includes a base connected to said barrier, and a tray connected to said base and extending laterally in a position to support said bag and the articles placed therein.

3. A sterilizing apparatus according to claim 1 in which the bag is transparent.

4. A sterilizing apparatus comprising, a vertically disposed gas-impermeable barrier, a completely flexible and collapsible gas-impermeable bag having a mouth adapted to receive articles and to surround a portion of said barrier, a band adapted to releasably clamp said mouth about and in gastight relationship with said portion of said barrier when said portion is surrounded by said mouth, channel means extending through said barrier for introducing into said bag a sterilant adapted to assume a gaseous state, means for preventing escape of said sterilant to the external atmosphere through said channel means, outlet means in said barrier to permit gas to pass from said bag through said barrier to the external atmosphere and valve means associated with said outlet means for releasably retaining said gas within said bag, to sterilize said articles.

5. A sterilizing apparatus according to claim 4 in which the outlet means includes a chamber through which the gas passes between the bag and the external atmosphere.

6. A sterilizing apparatus according to claim 5 in which a body of material having the property of adsorbing said sterilant, said material being retained in said chamber.

7. A sterilizing apparatus according to claim 4 in which said inlet means is provided with an aggregate of material presenting a substantial surface area contactable by said sterilant.

8. The combination comprising, a vertically disposed hollow housing, a gas-impermeable and completely flexible and collapsible bag adapted to receive articles and having a mouth adapted to surround a portion of said housing to form an envelope extending horizontally at the rear of said housing, means for releasably connecting said mouth to said portion of said housing in gastight relationship therewith, an inlet aperture and an exhaust aperture in said housing, sterilant conducting means extending through said housing and connected at one end to said inlet aperture and at the other end to means for retaining and piercing an ampule of pressurized sterilant capable of assuming a gaseous state, when released from said ampule, whereby said sterilant, when released from said ampule, is conducted through said housing and into said bag, valve means adapted to releasably seal said exhaust aperture to retain said sterilant within said bag and to be opened to permit gas to pass from said bag into the interior of said housing, and an exhaust port in said housing disposed to permit gas to pass from the interior of said housing to the outer atmosphere.

9. In combination with a gas-impermeable and completely collapsible bag having a mouth permitting insertion therein of articles to be sterilized, the combination comprising, a first cylinder having an inlet aperture and an exit aperture in the end thereof, a second cylinder disposed within said first cylinder and connected at its rear end to the inner surface of said end of said first cylinder surrounding said inlet aperture and having a bore therethrough connected to said inlet aperture, a bushing connected to the forward end of said second cylinder having a piercing pin disposed therein, means engageable with said bushing to receive a pierceable ampule containing under pressure a sterilant adapted to assume a gaseous state, said means being adapted to engage said ampule with the forward portion of said piercing pin to cause said forward portion of said pin to pierce and extend partially within said ampule, a channel in said piercing pin connecting the forward portion thereof with said bore to permit said sterilant to flow into said bore and thence rearwardly through said inlet aperture when said ampule is pierced, means to prevent flow of said sterilant from said bore into said channel, a third cylinder disposed within said first cylinder and connected at its rear end to the inner surface of said end of said first cylinder surrounding said exit aperture and bearing retaining means at its forward end, said third cylinder having a threaded bore therethrough connected to said exit aperture and a plurality of channels connecting said threaded bore with the interior of said first cylinder and a valve seat within said threaded bore intermediate said exit aperture and said channels, a threaded valve stem adapted to threadably engage said threaded bore, said valve stem having a knob at the forward end thereof and a valve head at the rear end adapted to seat against said valve seat to releasably seal said threaded bore, a cover plate having a pair of apertures therein disposed to surround said valve stem and said bushing, respectively, and having an exhaust aperture therein, said cover plate being adapted to be retained by said retaining means against and in gastight relation with the forward ends of said first, second and third cylinders, and means for releasably engaging the mouth of said bag with said first cylinder in gastight relationship therewith and surrounding said inlet and exit apertures, whereby said sterilant is introduced in a gaseous state into said bag in substantially pure form to sterilize said articles and whereby substantially all gas may be expelled from said bag to the outer atmosphere through said housing when said bag is collapsed by compression.

10. The combination according to claim 9 which includes a permeable aggregate of material presenting a substantial surface area disposed within said bore in said second cylinder to be contacted by and to increase the rate of gasification of said sterilant within said bore, and a permeable aggregate of adsorbent material disposed within said first cylinder and surrounding said second and third cylinders to be contacted by and to adsorb said sterilant within said first cylinder, and screen means covering said inlet, exit, and exhaust apertures to retain said adsorbent material within said first cylinder.

References Cited in the file of this patent

UNITED STATES PATENTS 2,965,936     Kaye _____ Dec. 27, 1960

FOREIGN PATENTS 106,007     Great Britain _____ May 10, 1917